Patented Oct. 18, 1938

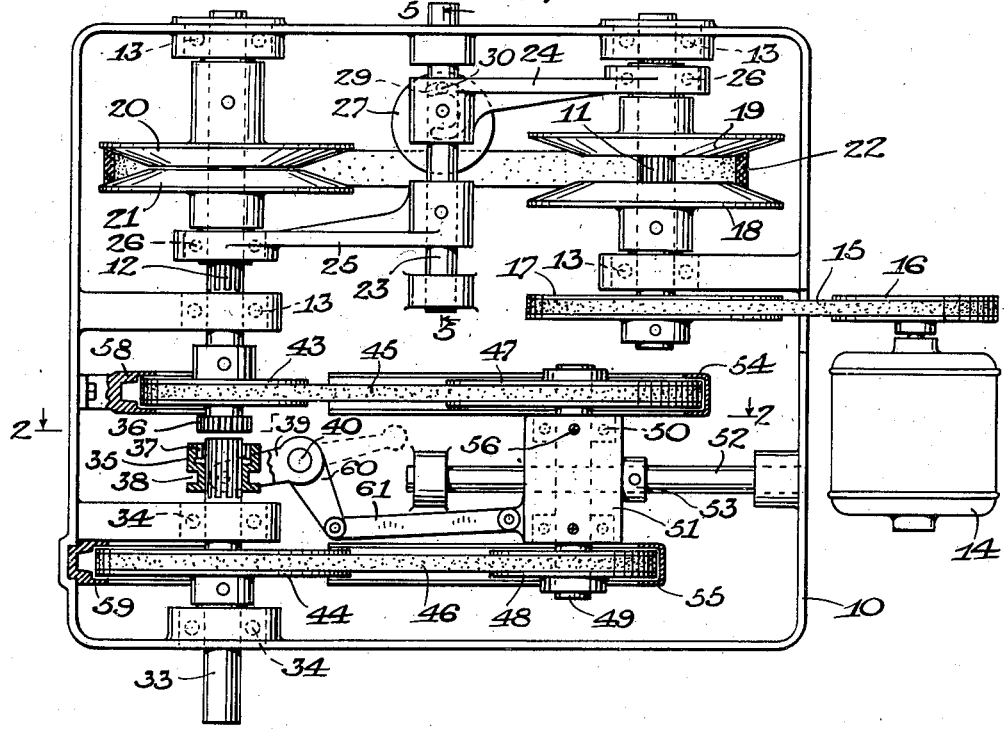

2,133,593

UNITED STATES PATENT OFFICE 2,133,593

VARIABLE SPEED DRIVE

Herbert E. Tautz, Milwaukee, Wis.

Application December 24, 1936, Serial No. 117,545

4 Claims. (Cl. 74—217)

The invention relates to variable speed drives and to transmission belt controls therefor.

An object of the invention is to provide a variable speed drive of simple, durable, and inexpensive construction, and having easily operated means for changing to different speeds.

Another object of the invention is to provide improved means for shifting a transmission belt, and more particularly a V-belt, into and out of driving engagement with a cooperating pulley.

A further object is to provide an improved power transmission including a simple but effective belt-driven back gear or reducer which is readily thrown into and out of action, and which when out of action will produce no drag on rotating parts.

The invention further consists in the several features hereinafter described and claimed.

In the accompanying drawing, illustrating a variable speed drive embodying the invention, Fig. 1 is a side elevation of a variable speed drive constructed in accordance with the invention, parts being broken away and parts being shown in section;

Fig. 2 is a sectional view taken along the line 2—2 of Fig. 1;

Fig. 3 is a detail sectional view showing a transmission belt disengaged from a cooperating pulley;

Fig. 4 is a detail sectional view of the belt and the companion pulley and its belt guide in shifted position to produce the belt disengagement illustrated in Fig. 3;

Fig. 5 is a sectional view taken along the line 5—5 of Fig. 1, and

Fig. 6 is a detail view of one of the belt guides.

In the drawing, 10 designates a frame in which a pair of parallel splined shafts 11 and 12 are journalled by suitable bearings 13, here indicated to ball bearings. The shaft 11 is driven from any suitable source of power, such as an electric motor 14. The motor is here indicated to have a belt connection with the shaft 11, but it will be obvious that a direct-drive may be employed, if desired. The belt drive comprises a V-belt 15 passing over a pulley 16 on the motor shaft and a pulley 17 on the shaft 11.

A pair of complementary pulley-forming cone-faced wheels 18 and 19 are mounted on the shaft 11, the former being fast on the shaft and the latter being splined on the shaft. A pair of similar cone-faced wheels 20 and 21 are mounted on the shaft 12, the former being fast on the shaft and the latter being splined on the shaft. A side-driving belt 22 of trapezoidal cross-section connects the two pulleys formed by the cone-faced wheels. The wheels 19 and 21 are on opposite sides of the respective wheels 18 and 20, and are connected for simultaneous sliding movement on the respective splined shafts 11 and 12 to vary the effective diameters of the pulleys, the wheel 19 being moved away from the wheel 18 when the wheel 21 is moved toward the wheel 20, so that when the effective diameter of one pulley is increased the effective diameter of the other is decreased. This movement is effected by a rod 23 extending parallel to and between the shafts 11 and 12, and axially slidable in the frame, the rod carrying a pair of arms 24 and 25 which are connected to the respective wheels 19 and 21 by anti-friction bearings 26, preferably ball bearings, resisting axial thrust on the wheel. The rod 23 is longitudinally displaced in any suitable manner, as by means of a cam 27 mounted on a shaft 28 journalled in the frame and extending at right-angles to the rod, the cam 27 having a spiral cam groove 29 receiving a follower pin 30 on the arm 24. The outer end of the shaft 28 carries a hand-lever 31 and a clamping nut 32, as seen in Fig. 5.

In axial alignment with the shaft 12 is an output shaft 33 journalled in the frame 10 by suitable anti-friction bearings 34, such as ball bearings. The end of the shaft 33 adjacent the shaft 12 is splined to slidably receive a clutch member 35, and the adjacent end of the shaft 12 is provided with clutch teeth 36 to be engaged by internal teeth 37 of the clutch member. The clutch member has an annular groove 38 engaged by a forked shifter 39 mounted on a rock shaft 40 journalled in the frame. The outer end of the rock shaft carries a hand lever 41 and a clamping nut 42, as seen in Fig. 2.

When the clutch member 35 is released, the shafts 12 and 33 are connectible by a speed-reducing transmission or back gearing now to be described. The shafts 12 and 33 have secured thereon respective pulleys 43 and 44, which receive respective belts 45 and 46, preferably V-belts, passing over respective pulleys 47 and 48 mounted on a counter-shaft 49 parallel to the shafts 12 and 33. The counter-shaft is journalled by ball bearings 50 in a housing or carrier 51 which is slidably mounted on a pair of parallel supporting rods 52 secured to the frame 10, the rods extending at right-angles to the shaft 33 and counter-shaft 49 and parallel to the plane of these shafts. The sliding movement of the housing away from the shafts 12 and 33 is limited by adjustable collars 53 on the rods so as to obtain the desired belt tension. The counter-shaft pulley 47 is larger than the pulley 43 and the pulley 44 is larger than the counter-shaft pulley 48, so as to provide a double speed reduction.

When the shafts 12 and 33 are to be directly connected by the clutch member 35, it is necessary to disconnect the back gearing. This is accomplished by shifting the counter-shaft toward the shafts 12 and 33, thus loosening the belts 45 and 46, means being provided for completely disengaging these belts from the pulleys 43 and 44. A pair of U-shaped belt-supporting and displacing guides 54 and 55 of channel cross-section are secured to the counter-shaft housing 51 by screws 56 passing through flanges 57 on the guides, the guides embracing, with a small clearance, the rim portions of the respective pulleys 45 and 46, and extending along the flights or runs of the belts to points adjacent the pulleys 43 and 44. Preferably, arcuate belt-guides 58 and 59 of channel cross-section are mounted on the frame 10 and extend along the peripheries of the respective pulleys 43 and 44 on the sides thereof distant from the counter-shaft. The grooves of the guides 58 and 59 receive and support the expanded bights of the belts when they are displaced from the pulley grooves, as indicated in Fig. 3, showing the pulley 43. The corresponding counter-shaft pulley 47 and the belt-engaging guide 54 thereof are indicated in Fig. 4, the guide engaging the expanded bight of the belt and displacing the belt as a whole. The housing 51 is movable along the supporting rods 52 to engage and release the belts 45 and 46 with respect to the pulleys 43 and 44. In the present instance, the movement of the housing is effected conjointly with the movement of the clutch member 35 by an arm 60 on the clutch-shifting lever connected to the housing by a link 61, the relation being such that when the clutch is released the belts are engaged, and vice versa. A sufficient amount of lost motion is provided in the travel of the clutch member to insure release of the belts before the clutch is engaged. Preferably, the belts are moved completely out of the pulleys 43 and 44, although a smaller movement is sufficient to release the belts and to obtain clearance.

The speed range of that part of the device which comprises the belt 22 and its associated variable diameter pulleys is preferably limited to a moderate value, for example, about three-to-one, or a little more, so that the belt 22 is not excessively wide and the pulleys are not unduly large in diameter. No spring means are required to urge the pulley-forming wheels to their adjusted positions. If the pulleys of the back gearing are selected to produce a speed range of about three-to-one, the overall speed range of the transmission will be about nine-to-one. Preferably, the speed range of the back gearing is slightly less than the speed range of the variable diameter pulley drive, so as to permit any intermediate speed ratio to be obtained in the overall range.

In operation, the shaft 11 is driven by the electric motor 14, and the shaft 12 is driven from the shaft 11 by the belt 22 and the associated variable diameter pulleys. The effective diameters of these pulleys are adjusted by the slidable cam-actuated rod 23 carrying the control arms 24 and 25. The oppositely directed axial thrusts exerted by the side driving belt 22 on the wheels 19 and 21 are resisted by the respective anti-friction bearings 26 and are substantially equalized or neutralized.

When power is to be delivered to the output shaft 33 in the low speed range, the shifter shaft 40 is turned to the position seen in Fig. 1, releasing the clutch member 35 and displacing the counter-shaft 49 laterally away from the axis of aligned shafts 12 and 33, causing the V-belt 45 to engage the pulleys 43 and 47 and the V-belt 46 to engage the pulleys 44 and 48. Power is thereby transmitted from the shaft 12 to the counter-shaft 49 and from the counter-shaft to the output shaft 33. The variable diameter pulley 20, 21 runs at a somewhat higher speed than the output shaft 33, thus providing favorable torque relations.

When power is to be delivered to the output shaft 33 in the high speed range, the shifter shaft 40 is turned in a clockwise direction from the position seen in Fig. 1, causing the counter-shaft 49 to be displaced toward the axis of the output shaft and the guides 54 and 55 to disengage the belts 45 and 46 from the pulleys 43 and 44 and to project their expanded bights into supporting engagement with the stationary guides 58 and 59. In the latter part of the movement of the shifter shaft 40 the clutch member 35 is engaged with the toothed end of the shaft 12, thereby providing a direct drive from the shaft 12 to the output shaft 33. During direct drive engagement, the counter-shaft, its pulleys, and the belts 45 and 46 are all at rest, the belts being completely released from the pulleys 43 and 44, so as to avoid imposing unnecessary drag when the output shaft runs at high speed.

The channel cross-section of the guides 54, 55, 58 and 59 provides effective guarding or housing of the belts and pulley rims, and permits the guides to be of strong but light-weight construction. The shoulders formed by the side walls of the grooves in the guides 58 and 59 prevent lateral displacement of the expanded belts out of alignment with the pulley grooves. In the embodiment of the invention shown in the drawing, the lower side walls of the grooves of these guides support the expanded belts against downward movement.

The various ball bearings for the variable speed drive are preferably of the grease-sealed type which require little or no attention for the life of the mechanism, and the other parts of the mechanism require little or no lubrication, thus simplifying construction and maintenance. The belts require no lubrication and operate quietly and efficiently.

What I claim as new and desire to secure by Letters Patent is:

1. In combination, a pair of aligned shafts having respective pulleys, releasable clutch means for connecting said shafts, a counter-shaft parallel to said first-named shafts, means for supporting said counter-shaft and for relatively displacing it toward and away from said shafts, pulleys on said counter-shaft, belts connecting said respective counter-shaft pulleys with said first-named pulleys, said pulleys and belts forming a speed-changing transmission, and means for supporting said belts out of contact with said first-named pulleys when said counter-shaft is relatively moved toward said first-named shafts.

2. In combination, a pair of aligned shafts having respective pulleys, releasable clutch means for connecting said shafts, a counter-shaft parallel to said first-named shafts, means for supporting said counter-shaft and for relatively displacing it toward and away from said shafts, pulleys on said counter-shaft, belts connecting said respective counter-shaft pulleys with said first-named pulleys, said pulleys and belts forming a speed-changing transmission, means for supporting said belts out of contact with said first-named pulleys when said counter-shaft is relatively moved toward said first-named shafts, and means for conjointly operating said clutch means and displacing said counter-shaft.

3. In combination, a pair of aligned shafts having respective pulleys, releasable clutch means for connecting said shafts, a counter-shaft parallel to said first-named shafts, pulleys on said counter-shaft, belts connecting said respective counter-shaft pulleys with said first-named pulleys to form a speed-changing transmission, means for supporting said counter-shaft and for relatively displacing said counter-shaft toward and away from said aligned shafts to respectively loosen and tighten the belts, and means for conjointly operating said clutch means and displacing said counter-shaft.

4. In combination, a pair of axially aligned rotatable members having respective pulleys, releasable clutch means for connecting said members, a counter-shaft having pulleys, belts connecting said counter-shaft pulleys with said first-named pulleys to form a speed-changing transmission, means for varying the tension on said belts to tighten and release said belts, and means for conjointly operating said clutch means and said belt-tension-varying means to render said clutch means and transmission selectively effective.

HERBERT E. TAUTZ.